(12) United States Patent
Zwanziger et al.

(10) Patent No.: US 9,802,141 B1
(45) Date of Patent: Oct. 31, 2017

(54) CLEANING SYSTEM FOR FILTER BEDS

(71) Applicant: IMC Consulting LLC, Oklahoma City, OK (US)

(72) Inventors: Wolfgang F Zwanziger, Oklahoma City, OK (US); Natasha S Zwanziger, Oklahoma City, OK (US); M Matt Smith, La Jolla, CA (US)

(73) Assignee: IMC Consulting LLC, Oklahoma City, OK (US)

( * ) Notice: Subject to any disclaimer, the term of this patent is extended or adjusted under 35 U.S.C. 154(b) by 744 days.

(21) Appl. No.: 14/197,076

(22) Filed: Mar. 4, 2014

(51) Int. Cl.
*B01D 24/46* (2006.01)
*B01D 24/00* (2006.01)
*C02F 1/00* (2006.01)

(52) U.S. Cl.
CPC .......... *B01D 24/46* (2013.01); *B01D 24/002* (2013.01); *C02F 1/004* (2013.01)

(58) Field of Classification Search
CPC ................. C02F 1/004; B01D 24/46–24/4694
USPC .................................................. 210/190–191
See application file for complete search history.

(56) References Cited

U.S. PATENT DOCUMENTS

| | | | |
|---|---|---|---|
| 2,084,659 A | 6/1937 | Streander | |
| 2,559,784 A | 7/1951 | Moore | |
| 3,286,842 A | 11/1966 | De Jong | |
| 4,076,625 A | 2/1978 | Scholten et al. | |
| 5,069,779 A * | 12/1991 | Brown | C02F 1/42 210/143 |
| 6,309,470 B1 | 10/2001 | Schulhoff et al. | |
| 6,346,217 B1 | 2/2002 | Schaal | |
| 7,183,246 B2 | 2/2007 | Schulhoff et al. | |
| 2006/0043028 A1 | 3/2006 | Reimann-Philipp et al. | |
| 2008/0006589 A1 | 1/2008 | Reimann-Philipp et al. | |
| 2008/0314416 A1 | 12/2008 | Reimann-Philipp et al. | |
| 2010/0143187 A1 | 6/2010 | Reimann-Philipp et al. | |

OTHER PUBLICATIONS

Technical Support Services, TSS Water Course, Module 11, Waste Neutralization, Internet web site, Jan. 30, 2005, pp. 1-2a, 1-2 and 1-3a https://web.archive.org/web/20050130145411/http://www.tectrapro.com/other_files/Manuals/waste.pdf.

* cited by examiner

*Primary Examiner* — T. Bennett McKenzie
(74) *Attorney, Agent, or Firm* — Gary Peterson

(57) ABSTRACT

A cleaning system for filter beds uses the existing permanent infrastructure of a water filtration plant. Treatment fluids of opposite pH are introduced into a pair of filter cells that are separated by a gullet. Each filter cell contains a filter bed. One filter cell receives an acidic treatment fluid and the other receives an alkaline treatment fluid. After treatment is complete, the treatment fluids from each filter cell are simultaneously drained into the gullet, where mixing and neutralization occur. The resulting spent treatment fluid has an intermediate pH that allows it to be safely drained into a wastewater sewer.

20 Claims, 3 Drawing Sheets

CLEANING SYSTEM FOR FILTER BEDS

SUMMARY OF THE INVENTION

A system is formed from first and second filter cells and a receptacle. The first filter cell contains a granular media filter bed and a first treatment fluid having an acidic first pH. The second filter cell contains a granular media filter bed and a second treatment fluid having an alkaline second pH. The second filter cell is in fluid isolation from the first filter cell. The receptacle is adapted for selective fluid communication with each of the first and second filter cells. Treatment fluids from the first and second filter cells may be received and mixed within the receptacle to produce a spent treatment fluid having a third pH intermediate to the first and second pHs.

A method of cleaning granular media filter beds in first and second filter cells. The filter bed of the first filter cell is treated with a first treatment fluid having a first acidic pH. The filter bed of the second filter cell is treated with a second treatment fluid having a second alkaline pH. Each filter cell is maintained in fluid isolation from the other as it is treated. Outflow from the first and second filter cells is combined in a receptacle to produce a spent treatment fluid having a third pH intermediate the first and second pHs.

DETAILED DESCRIPTION

Figure 1:
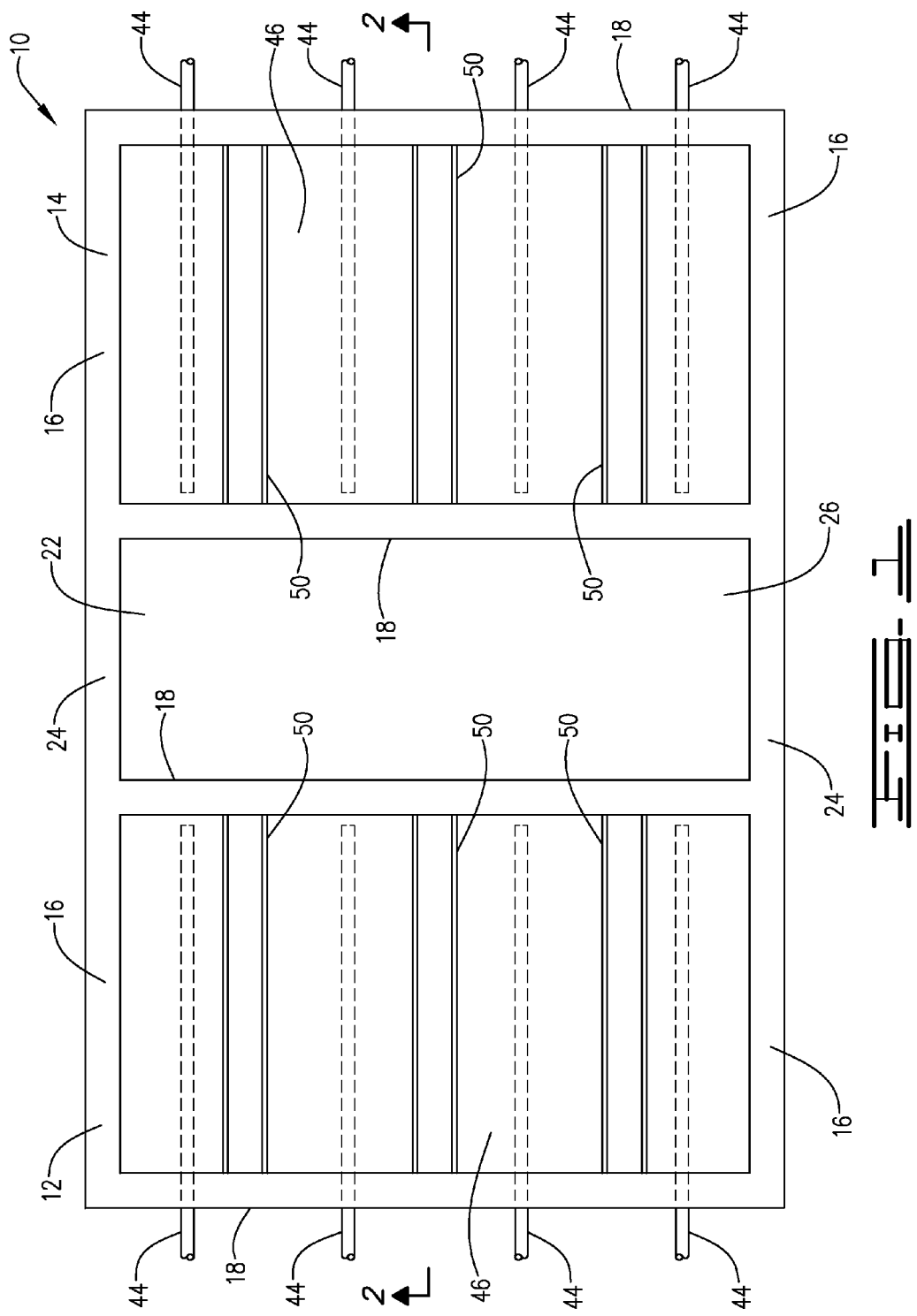
FIG. 1 is a plan view of a water filtration plant that includes adjacent first and second filter cells. Hidden portions of the collection conduits are shown in dashed line.
Figure 2:
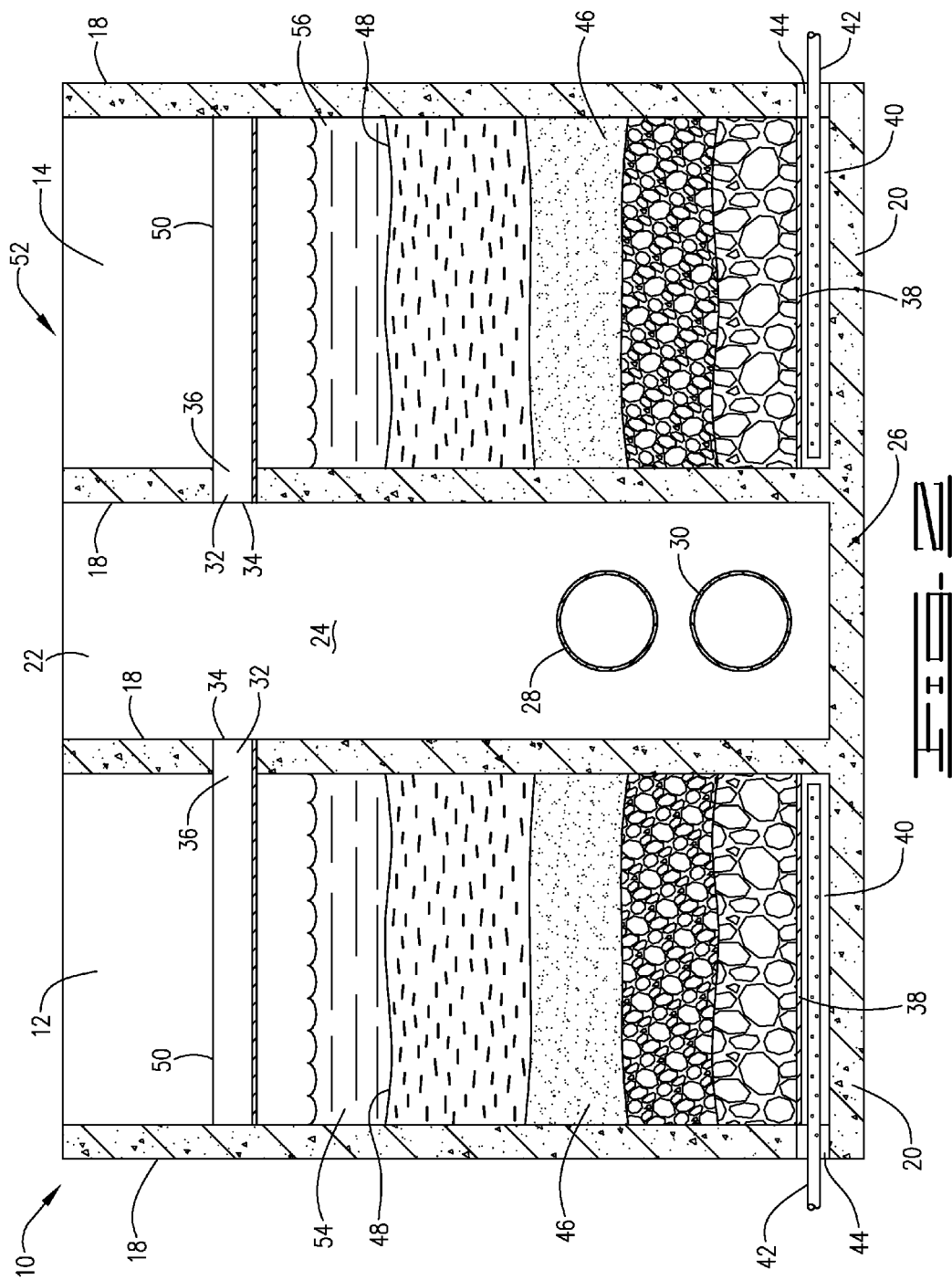
FIG. 2 is a cross-sectional view of the water filtration plant shown in FIG. 1 at an initial stage of the cleaning of filter beds in the filter cells.

FIGS. 1 and 2 show the permanent infrastructure of an existing water filtration plant 10 that is used to filter drinking water or waste water. The water filtration plant 10 includes a plurality of filter cells. A pair of such filter cells, a first filter cell 12 and a second filter cell 14, are shown in the Figures. Both filter cells 12 and 14 are permanent parts of the plant 10.

The filter cells 12 and 14 are preferably identically shaped and sized. Each filter cell has a rectangular cross section and is formed by a pair of spaced, parallel and vertical end walls 16 and a pair spaced, parallel and vertical side walls 18. Joining the lower ends of the spaced walls is a horizontal base wall 20. Each filter cell is preferably open at its upper end. The walls of the filter cells are preferably formed from concrete.

Preferably, the side walls 18 forming the respective filter cells 12 and 14 extend in parallel relationship to one another. Each end wall 16 forming each filter cell is preferably aligned with a corresponding end wall 16 of the other filter cell. Likewise, each base wall 20 forming each filter cell is preferably aligned with a corresponding base wall 20 forming the other filter cell.

Situated between the first and second filter cells 12 and 14 is a receptacle 22, which preferably comprises a gullet. Like the filter cells 12 and 14, the receptacle 22 is a permanent part of the plant 10. The receptacle 22 has a rectangular cross section and is formed by a pair of spaced, parallel and vertical end walls 24 and a pair spaced, parallel and vertical side walls. Joining the lower ends of the spaced walls is a horizontal base wall 26. The receptacle 22 is preferably open at its upper end. The walls of the receptacle 22 are preferably formed from concrete.

Preferably, the receptacle 22 shares each of its side walls with an adjacent filter cell. Specifically, the closest pair of side walls 18 chosen respectively from different filter cells 12 and 14 serve concurrently as spaced side walls forming receptacle 22.

Each aligned pair of end walls 16 is preferably also aligned with an end wall 24 forming the receptacle 22. More preferably, the aligned end walls 16 and 24 are formed as a single homogeneous structure. Similarly, each aligned pair of base walls 20 is preferably also aligned with a base wall 26 forming receptacle 22. More preferably, the aligned base walls 20 and 26 are formed as a single homogeneous structure.

Formed in one end wall 24 of the receptacle 22 are an inlet port 28 and an outlet port 30. Fluid such as partially treated drinking water or waste water may flow into the receptacle 22 through the inlet port 28. Fluid accumulating within the receptacle 22 may be drained through the outlet port 30. Valves are provided to enable independent opening and closing of each of the ports 28 and 30.

Each of the filter cells 12 and 14 communicates with the receptacle 22 by a plurality of conduits 32, each of which preferably extends through the shared side wall 18 of the communicating structures. Each conduit 32 features opposed first and second ports 34 and 36. The first port 34 discharges into the receptacle 22, while the second port 36 discharges into its communicating filter cell. As shown in FIG. 2, each of the ports of each conduit 32 is positioned at an elevated level well above the base wall of the structure into which it discharges.

A perforated bed support platform 38 is formed within each filter cell 12 and 14. The bed support platform 38 is situated in parallel and upwardly spaced relationship to the base wall 20 of the filter cell. The bed support platform 38 cooperates with the base wall 20 and the walls 16 and 18 to form a lower chamber 40 situated at the lower end of each filter cell.

Communicating with each lower chamber 40 is a perforated collection conduit 42 that can receive fluid from the lower chamber 40 and carry it out of the filter cell. The collection conduit 42 extends out of the lower chamber 40 through an opening 44 in one of the walls forming the filter cell. The plant 10 includes valves and equipment for regulating fluid flow through the collection conduit 42.

The bed support platform 38 in each filter cell 12 and 14 carries a filter bed 46 formed from granular media. Typically, such a filter bed 46 is formed from layers of different granular media, such as carbon, sand and gravel. The upper surface 48 of each filter bed 46 is situated below the second port 36 of conduit 32.

A plurality of upright, open-topped and rectilinear troughs 50 is formed in each filter cell. The troughs 50 extend in parallel relationship to the end walls 16 forming the filter cell. The number of troughs 50 formed in each filter cell should equal the number of conduits 32 that discharge into that filter cell. Each trough 50 should be elevated above the upper surface 48 of the filter bed 46 formed in a filter cell.

Each trough 50 communicates at one of its ends with the second port 36 of a conduit 32. The opposite end of each trough 50 is closed. As a result of this closure, fluid discharging from second port 36 into the trough 50 overflows the walls of the trough and drops onto the filter bed 46.

The receptacle 22 is adapted for selective fluid communication with each of the first and second filter cells 12 and 14. When the fluid level in each of the filter cells 12 and 14 is below the level of second port 36, fluid flow through the conduits 32 and into the receptacle 22 cannot occur. When the fluid level in each of the filter cells 12 and 14 is greater than or equal to the level of second port 36, fluid flow through the conduits 32 and into the receptacle 22 can take place.

During normal filtering operations, outlet port 30 is closed. Fluid to be filtered discharges from inlet port 28 and is received in receptacle 22. The fluid level in receptacle 22 rises until it reaches the first ports 34. The fluid then flows through the conduits 32, through second ports 36, and into the troughs 50. Fluid overflows the walls of the troughs 50 and drops onto each filter bed 46.

Under gravity, fluid seeps through each filter bed 46, where impurities carried in the fluid are deposited on the granular media forming the filter bed 46. Filtered fluid exits the base of each filter bed 46, passes through bed support platform 38 and discharges into lower chamber 40. There, filtered fluid is received in collection conduits 42 and transferred out of the filter cells 12 and 14. The cycle is then repeated with a new batch of fluid.

After the filter bed 46 has undergone several filtering cycles, accumulated impurities on the granular media reduce the effectiveness of the filter bed 46. To restore at least a portion of the bed's filtering efficacy, the filter bed 46 is periodically treated by one or more backwashing cycles.

During a backwash operation, fluid is drained from each filter cell 12 and 14. The inlet port 28 in receptacle 22 is closed and outlet port 30 is opened. A pressurized backwash fluid, normally water, is pumped in a reverse direction through collection conduit 42 and into lower chamber 40. The pressurized backwash fluid then flows through bed support platform 38, into the filter bed 46 at its base, and upwardly through the filter bed 46. Impurities that have deposited on the granular media forming the filter bed 46 are carried away with the backwash fluid.

Backwash fluid exits the filter bed 46 at its upper surface 48. As the fluid level rises the in each filter cell, the backwash fluid rises above the level of second port 36, overflows the walls of each trough 50 and is carried by the trough 50 through conduit 32 and first port 34 and into receptacle 22. The impurity-laden backwash fluid is drained from receptacle 22 through outlet port 30. Because the backwash fluid is water, it can safely be discharged through outlet port 30 into a wastewater sewer.

If necessary, the backwash cycle may be repeated one or more times with new batches of backwash fluid. After backwashing is completed, each filter cell is drained, outlet port 30 is closed and inlet port 28 is opened. Normal filtering operations in the filter cells 12 and 14 then resume.

During the lifetime of a filter bed 46, impurities continue to accumulate on the granular media during successive filtering cycles. While periodic backwashing can remove some of these impurities, it cannot remove all of them. As difficult-to-remove impurities build up on the granular media, backwashing becomes progressively less effective in restoring the bed's filtering efficacy. At some point, more aggressive chemical cleaning strategies become necessary if use of the filter bed 46 is to continue. The alternative is costly replacement of the granular media forming the bed.

In a typical chemical cleaning operation, inlet port 28 is closed. A filter cell having a filter bed to be cleaned is first backwashed with backwash fluid. The backwash fluid is then drained from receptacle 22 through outlet port 30. If necessary, the fluid level in the filter cell is next lowered by drawing off fluid through the collection conduit 42. The lowered fluid level should be sufficient to allow the filter cell to receive all of the treatment fluid to be added in the next step. Collection conduit 42 and outlet port 30 are then closed.

An aqueous solution of one more cleaning chemicals is prepared. The chemical solution is pumped into the filter cell at its open upper end. If necessary, the fluid level in the filter cell is adjusted to bring it above upper surface 48 of filter bed 46, while remaining below the troughs 50 and second ports 36. The fluid level can be raised in a filter cell by beginning a slow backwash operation with an aqueous backwash fluid. The backwash operation is terminated when the desired fluid level in the filter cell is reached.

The aqueous chemical solution is typically strongly acidic or strongly alkaline. Exemplary chemical solutions are aqueous sodium bisulfate solution and aqueous sodium carbonate solution. After the chemical solution has been introduced into a filter cell, an oxidizing agent, such as aqueous hydrogen peroxide, is added to the chemical solution. The resulting treatment fluid is allowed to remain in the filter cell for a residence period, such as 12 hours, 24 hours or 48 hours, until chemical cleaning of the granular media is complete.

The filter cell is next subjected to one or more backwash cycles. The pressurized aqueous backwash fluid carries the spent treatment fluid 58 over the walls of the troughs 50 and into the receptacle 22.

Because the spent treatment fluid 58 collected in receptacle 22 remains strongly acidic or strongly alkaline, it cannot safely be discharged through outlet conduit 30 into a wastewater sewer. Instead, the spent treatment fluid 58 must be pumped from the receptacle 22 into a collection vessel, where one or more neutralizing chemicals are added. The neutralizing chemicals adjust the pH of the spent treatment fluid 58 to an environmentally acceptable level. Only then can the spent treatment fluid 58 safely be discharged into a wastewater sewer. The costs for neutralizing chemicals and a collection vessel, as well as the handling costs for the spent treatment fluid 58, contribute significantly to the overall cost of chemical cleaning.

Once backwashing is complete and spent treatment fluid 58 has been removed from receptacle 22, inlet port 28 is reopened and normal filtering operations resume in the filter cell. This process can be repeated to clean the filter beds in other filter cells.

Figure 3:
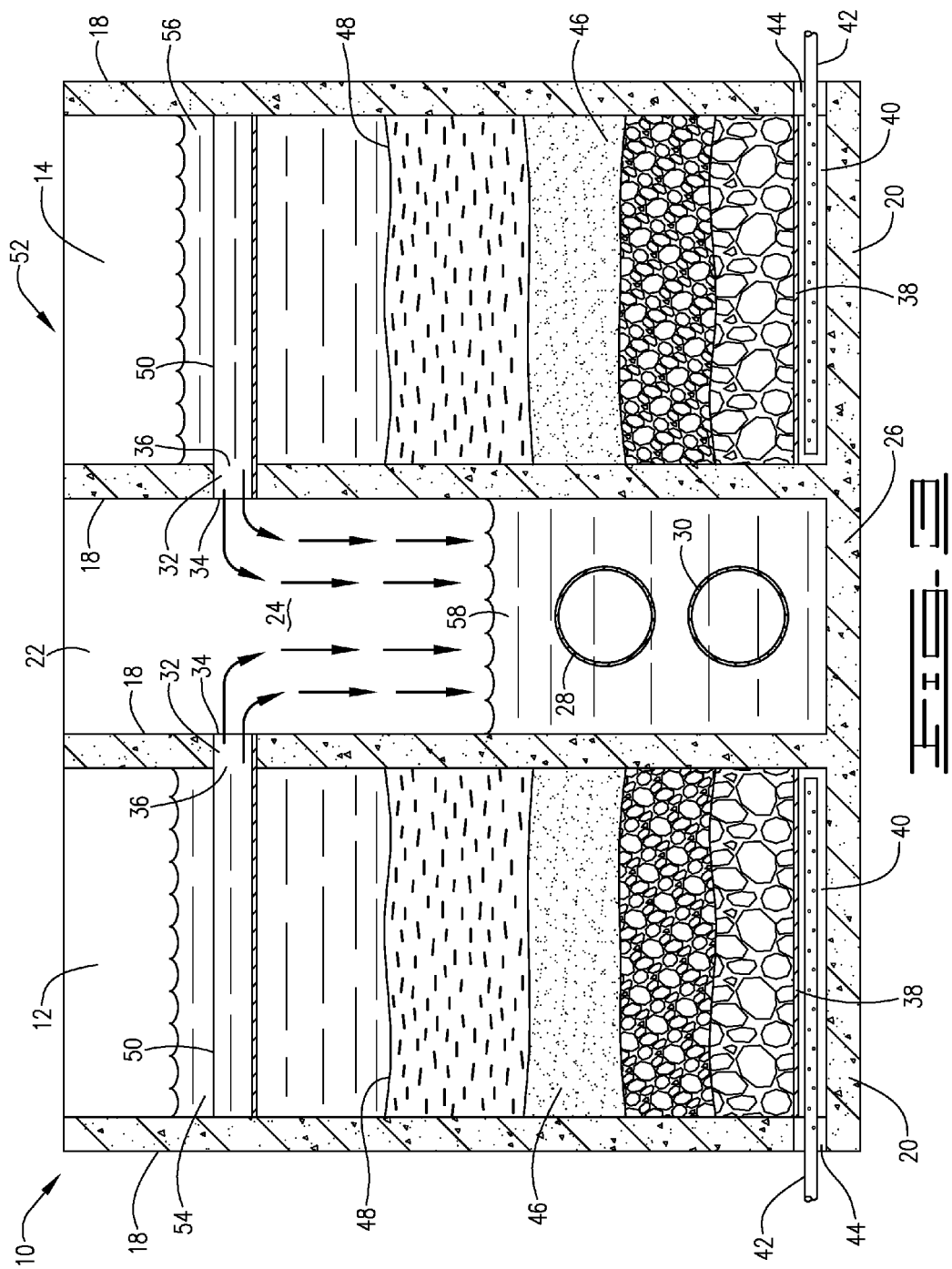
FIG. 3 is a cross-sectional view of the water filtration plant shown in FIG. 1 at a later stage of the cleaning of filter beds in the filter cells.

FIGS. 2 and 3 show a cleaning system 52 for filter beds that offers significant cost advantages over the typical chemical cleaning systems described above. As shown in FIG. 2, the filter bed 46 in the first filter cell 12 is treated with a first treatment fluid 54 having an acidic first pH. The first filter cell 12 is maintained in fluid isolation from the second filter cell 14 while this treatment occurs.

The filter bed 46 in the second filter cell 14 is treated with a second treatment fluid 56 having an alkaline second pH. The second filter cell 14 is maintained in fluid isolation from the first filter cell 12 while this treatment occurs.

The first and second treatment fluids 54 and 56 may be prepared wholly or partly in situ within their respective filter cells. Alternately, one or both treatment fluids may be prepared, in whole or in part, in an external vessel. Each treatment fluid and any of its components is preferably introduced into its respective filter cell through the filter cell's open upper end.

The first and second treatment fluids 54 and 56 remain in their respective filter cells 12 and 14, preferably concurrently, for residence periods sufficient to effect chemical cleaning of the granular media in each filter bed 46. During these residence periods, each filter cell remains in fluid isolation from the other.

During these residence periods, the fluid levels in each filter bed 46 are maintained above the upper surface 48 of each filter bed 46. The fluid level in each of the first and second filter cells 12 and 14 remains below the level of second port 36 for at least a portion of, and preferably the entirety of, these residence periods. Preferably, the volumes of first and second treatment fluids 54 and 56 within the respective filter cells 12 and 14 are approximately equal.

After chemical cleaning of the granular media in the filter cells is complete, water backwash cycles are begun in each of the filter cells 12 and 14. Preferably, these backwash cycles are carried out concurrently. The fluid level rises in each of the filter cells 12 and 14 until it is at or above the level of the second ports 36. The rising fluids overflow the walls of troughs 50 and enter the second ports 36. Fluid then flows through each conduit 32 and discharges through first port 34 into the receptacle 22, as shown in FIG. 3. The outflow from each filter cell into receptacle 22 preferably occurs concurrently with the outflow from the other filter cell into receptacle 22.

As noted above, the volumes of the first and second treatment fluids 54 and 56 are preferably approximately equal. The volumes and pressures of the backwash water introduced into each filter cell are preferably equal as well. As a result, the treatment fluids should discharge into the receptacle 22 from each filter cell at the same rate, and during the same time period.

The treatment fluids that discharge concurrently from the first and second filter cells 12 and 14 are received in receptacle 22, where the treatment fluids mix with one another and with the backwash water, and are neutralized. The result is a spent treatment fluid 58 having a third pH intermediate to the first and second pHs. Preferably the third pH is one that permits environmentally acceptable discharge of the spent treatment fluid into a wastewater sewer. In one embodiment, the pH of the spent treatment fluid is between about 6 and about 9.

The quantities and types of chemicals used to the first and second treatment fluids 54 and 56 are selected to produce the desired third pH when they are mixed, together with aqueous backwash fluid, in receptacle 22.

As the spent treatment fluid 58 having the third pH is formed by mixing in receptacle 22, it is quickly discharged through outlet port 30, which preferably is connected to a wastewater sewer. Once backwashing of the filter cells 12 and 14 is complete, outlet port 30 is closed, inlet port 28 is opened, and normal filtration operations resume.

This cleaning system for filter cells makes optimal use of the existing permanent infrastructure of a water treatment plant. Adjacent pairs of filter cells 12 and 14 are cleaned with treatment solutions of opposite pH. Once cleaning of filter beds is complete, the existing gullet or receptacle 22 between the filter cells 12 and 14 is used to mix and react the two treatment solutions. The result is a spent treatment solution with a more nearly neutral pH that can be safely discharged into a wastewater sewer. The system has no need for additional neutralizing chemicals, nor does it require a separate collection vessel for handling spent treatment fluid.

Changes may be made in the construction, operation and arrangement of the various parts, elements, steps and procedures described herein without departing from the spirit and scope of the invention as described in the following claims.

The invention claimed is:

1. A system, comprising:
    a first filter cell containing a granular media filter bed and a first treatment fluid having an acidic first pH;
    a second filter cell containing a granular media filter bed and a second treatment fluid having an alkaline second pH, the second filter cell in fluid isolation from the first filter cell; and
    a receptacle adapted for selective fluid communication with each of the first and second filter cells, within which treatment fluids from the first and second filter cells may be received and mixed to produce a spent treatment fluid having a third pH intermediate to the first and second pHs;
    in which each filter cell has an open upper end exposed to the ambient atmosphere.

2. The system of claim 1 in which each filter cell communicates with the receptacle by at least one conduit, each such conduit having a port situated above the base of its associated filter cell.

3. The system of claim 2 in which the fluid level in each filter cell is below port level, such that fluid flow through the conduits and into the receptacle cannot occur.

4. A water filtration plant including the system of claim 3 in which the receptacle is a gullet situated between first and second filter cells, the filter cells and gullet constituting permanent parts of the plant.

5. The system of claim 2 in which the fluid level in each filter cell is greater than or equal to port level, such that fluid flow through the conduits and into the receptacle can occur.

6. A water filtration plant including the system of claim 5 in which the receptacle is a gullet situated between first and second filter cells, the filter cells and gullet constituting permanent parts of the plant.

7. The system of claim 5 in which the receptacle contains spent treatment fluid formed by mixing of the first and second treatment fluids.

8. A water filtration plant including the system of claim 1.

9. The water filtration plant of claim 8 in which the receptacle is a gullet situated between first and second filter cells, the filter cells and gullet constituting permanent parts of the plant.

10. The system of claim 1 in which the filter bed of each filter cell includes one or more of granular carbon, granular sand and granular gravel.

11. A method of cleaning granular media filter beds in first and second filter cells, each filter cell having a base and the second filter cell in fluid isolation from the first filter cell, comprising:
    treating the filter bed of the first filter cell with a first treatment fluid having a first acidic pH;
    treating the filter bed of the second filter cell with a second treatment fluid having a second alkaline pH while the second filter cell is maintained in fluid isolation from the first filter cell; and
    combining outflow from the first and second filter cells in a receptacle to produce a spent treatment fluid having a third pH intermediate to the first and second pHs,
    wherein each filter cell has an open upper end exposed to the ambient atmosphere.

12. The method of claim 11 in which the first filter cell communicates with the receptacle by at least one conduit, each such conduit having a port situated above the base of the filter cell, and in which the fluid level in the first filter cell is maintained below port level during at least a portion of the treating step for that filter cell.

13. The method of claim 12 in which the fluid level in the first filter cell is raised to at or above port level following the treating step for that filter cell.

14. The method of claim 12 in which the method is carried out in a pre-existing water filtration plant, and in which the receptacle is a gullet situated between adjacent first and second filter cells, the filter cells and gullet constituting permanent parts of the plant.

15. The method of claim 11 in which each filter cell communicates with the receptacle by at least one conduit, each such conduit having a port situated above the base of its associated filter cell, and in which the fluid level in each filter cell is maintained below port level during at least a portion of the treating step for that filter cell.

16. The method of claim 15 in which the fluid level in each filter cell is raised to at or above port level following the treating step for that filter cell.

17. The method of claim 16 in which the method is carried out in a pre-existing water filtration plant, and in which the receptacle is a gullet situated between adjacent first and second filter cells, the filter cells and gullet constituting permanent parts of the plant.

18. The method of claim 11 in which the method is carried out in a pre-existing water filtration plant, and in which the receptacle is a gullet situated between adjacent first and second filter cells, the filter cells and gullet constituting permanent parts of the plant.

19. The method of claim 18 in which the outflows from the first and second filter cells into the receptacle occur concurrently.

20. The method of claim 11 in which the outflows from the first and second filter cells into the receptacle occur concurrently.

* * * * *